United States Patent
Nitsuma

(10) Patent No.: US 8,419,126 B2
(45) Date of Patent: Apr. 16, 2013

(54) SEAT-BACK FRAME AND VEHICLE SEAT

(75) Inventor: Kenichi Nitsuma, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 489 days.

(21) Appl. No.: 12/669,624

(22) PCT Filed: Jul. 17, 2008

(86) PCT No.: PCT/JP2008/062917
§ 371 (c)(1),
(2), (4) Date: Jan. 19, 2010

(87) PCT Pub. No.: WO2009/011388
PCT Pub. Date: Jan. 22, 2009

(65) Prior Publication Data
US 2010/0176630 A1     Jul. 15, 2010

(30) Foreign Application Priority Data

Jul. 19, 2007   (JP) ................................. 2007-188888

(51) Int. Cl.
*B60N 2/427*     (2006.01)
(52) U.S. Cl.
USPC ............................. 297/216.13; 297/216.12
(58) Field of Classification Search ............. 297/216.13, 297/216.12
See application file for complete search history.

(56) References Cited

U.S. PATENT DOCUMENTS

| 6,250,714 | B1 * | 6/2001 | Nakano et al. | 297/216.13 |
| 6,375,262 | B1 * | 4/2002 | Watanabe | 297/216.13 |
| 6,837,541 | B2 * | 1/2005 | Farquhar et al. | 297/216.13 X |
| 6,955,397 | B1 * | 10/2005 | Humer | 297/216.12 X |
| 7,967,380 | B2 * | 6/2011 | Omori et al. | 297/216.13 |

FOREIGN PATENT DOCUMENTS

| DE | 102 49 265 B3 | 2/2004 |
| EP | 1 053 907 A1 | 11/2000 |
| EP | 1 815 769 A1 | 8/2007 |
| JP | 10138811 A * | 5/1998 |
| JP | 2000-201769 A | 7/2000 |
| JP | 2000-325179 A | 11/2000 |
| JP | 2001-026232 A | 1/2001 |
| JP | 2003-341402 A | 12/2003 |
| JP | 2005-028956 A | 2/2005 |
| JP | 2007-062522 A | 3/2007 |

* cited by examiner

*Primary Examiner* — Anthony D Barfield
(74) *Attorney, Agent, or Firm* — Drinker Biddle & Reath LLP

(57) ABSTRACT

A seat-back frame of a seat-back comprises at least a pair of right and left side frames, a pressure receiving member disposed between the side frames, and wires for connecting the pressure receiving member to the side frames, respectively; wherein the wire is connected to the side frames through link members which are operable relative to the side frames, respectively, and wherein the link members are so configured that the wire is urged toward a forward side of the seat-back frame by tension springs.

24 Claims, 5 Drawing Sheets

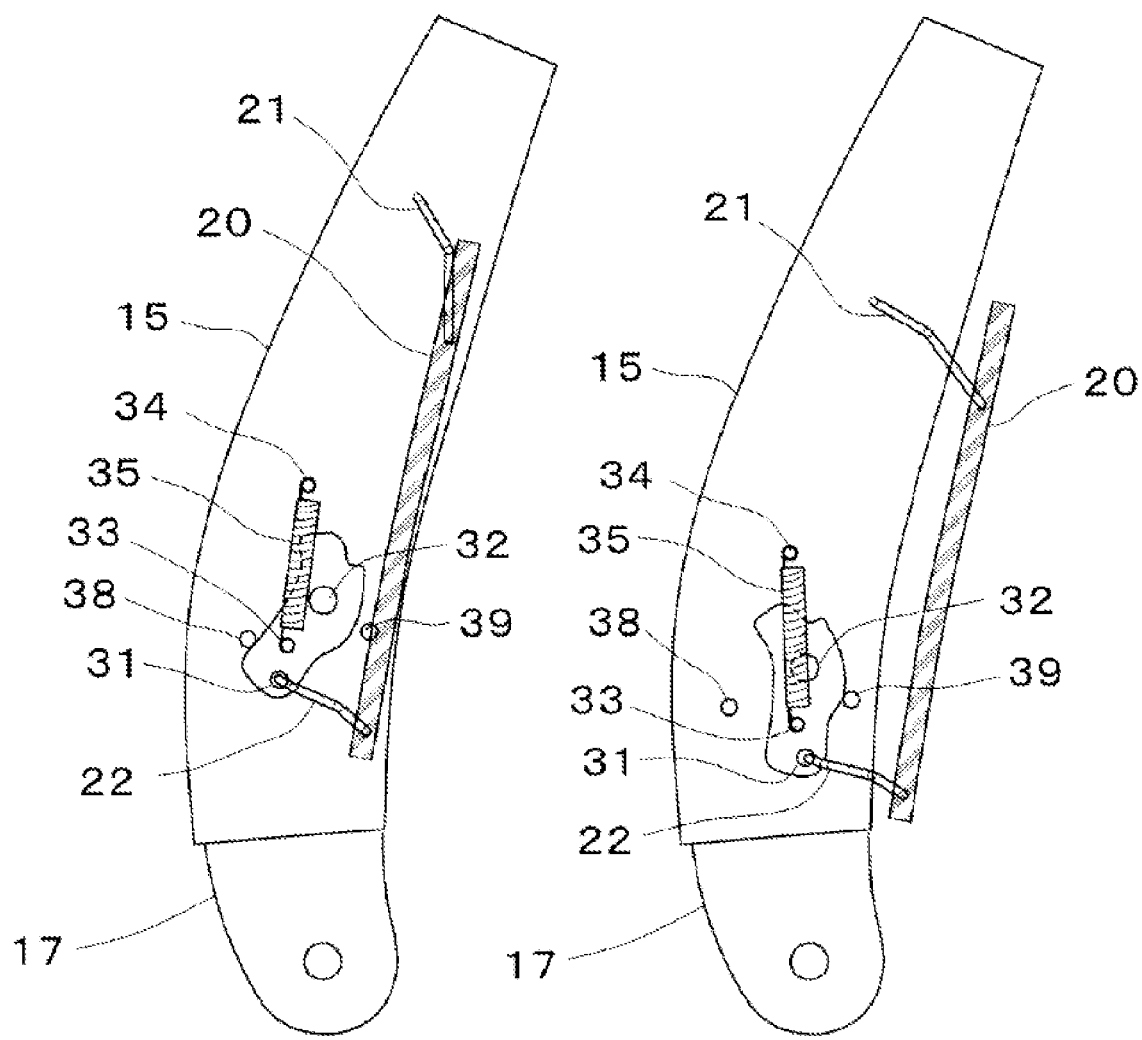
FIG. 5A     FIG. 5B

SEAT-BACK FRAME AND VEHICLE SEAT

CROSS-REFERENCE TO RELATED APPLICATIONS

This application is the U.S. national phase of the International Patent Application No. PCT/JP2008/062917 filed Jul. 17, 2008, which claims the benefit of Japanese Patent Application No. 2007-188888 filed Jul. 19, 2007, the entire content of which is incorporated herein by reference.

BACKGROUND

The present invention relates to a seat-back frame and a vehicle seat, and particularly to a seat-back frame and a vehicle seat that reduces an impactive shock that would otherwise be applied to a neck portion upon a rear-end collision.

Conventionally, upon so-called rear-end collision, such as a collision against a rear portion of a vehicle, and collision of a vehicle during rearward movement thereof, it is likely that a head portion of a seating occupant is suddenly tilted rearward due to inertial movement so that a neck portion of the occupant is likely to be subjected to an impactive shock.

Thus, seats for vehicles such as automobiles are each provided with a headrest located above a seat-back and configured to receive a head portion of an occupant from the rearward, so as to protect the head portion, a neck portion, and the like of the occupant, and to mitigate an impact against the head portion upon rear-end collision.

However, even with the provision of the headrest, it is sometimes impossible to sufficiently mitigate an impactive shock to be otherwise applied to the neck portion of the occupant, unless a gap between the head portion of the occupant and the headrest is quickly reduced upon rear-end collision.

To solve such a problem, there has been proposed such a seat-back configured to rearwardly move an occupant upon rear-end collision, and to forwardly operate a headrest by this movement load to support a head portion of the occupant, thereby mitigating an impactive shock that would otherwise be applied to a neck portion of the occupant (see Japanese unexamined patent publication no. JP2003-341402A ("the '402 Publication"), for example).

Further, there has been known such a technique in a vehicle seat configured to include a seat-back having a seat-back frame for supporting a seat-back cushion, wherein a region of the seat-back, to which a chest portion (herein defined as an upper torso portion) of an occupant abuts upon rear end collision, is rendered to have a smaller spring coefficient and a larger damping coefficient than other regions (see Japanese unexamined patent publication no. JP2005-028956A ("the '956 Publication"), for example).

The technique disclosed in the '402 Publication is configured to receive a rearward movement of the chest portion of the occupant upon rear-end collision by a pressure receiving member, and to forwardly move the headrest interlockedly with a rearward movement of the pressure receiving member. However, the technique is configured such that a part of energy of the rearward movement of the occupant upon rear-end collision is consumed for the forward movement of the headrest, thereby disadvantageously making it difficult to substantially increase a sinking amount of the occupant into a seat cushion. It is further required to separately provide a mechanism for moving the headrest, thereby disadvantageously increasing the cost of the seat.

In turn, the technique disclosed in the '956 Publication is configured: to reduce the spring coefficient of the region, to which the chest portion of the occupant abuts, to increase a rearward displacement of the chest portion, thereby decreasing a relative displacement between the head portion and the chest portion; and to increase the damping coefficient, to thereby restrict a rebound of the chest portion so as to reduce a relative speed between the head portion and chest portion, thereby reducing a shearing force acting on the neck portion. However, this rather makes it difficult to hold a posture by the pressure receiving member, thereby disadvantageously making it difficult to simultaneously establish a posture holding and a seating feeling.

In this respect, according to a technique to mount the pressure receiving member to the seat frame by a wire for posture holding, the wire would be stiff and obstruct sinking to make it difficult to increase a displacement of sinking, thereby disadvantageously making it difficult to simultaneously establish the increased displacement and the seating feeling.

SUMMARY

In view of the above problems, it is therefore an object of the present invention to provide a seat-back frame and a vehicle seat that effectively mitigates an impactive shock that would otherwise be applied to a neck portion of an occupant upon rear-end collision.

It is another object of the present invention to provide a seat-back frame and a vehicle seat that effectively mitigates an impactive shock that would otherwise be applied to a neck portion upon rear-end collision, at a lower cost and with a simple configuration.

The above problems are solved by a seat-back frame of a seat-back, comprising: side frames separated from each other at least in a right-and-left direction and extending in an up-and-down direction; a pressure receiving member disposed between the side frames; and a connecting member for connecting the pressure receiving member to the side frames, wherein the connecting member is connected to the side frames through link members which are operable relative to the side frames, respectively, and the link members are configured so that the connecting member is urged toward a forward side of the seat-back frame by urging an element(s).

In this way, the connecting member for connecting the pressure receiving member to the side frames is connected to the side frames through the link members which are operable relative to the side frames, and the link members are so configured that the connecting member is urged toward a forward side of the seat-back frame by an urging element(s). As a result, the pressure receiving member is kept from operating in an ordinary state, by virtue of urging by the urging element(s). However, when a larger impact load is applied to the connecting member, such as upon rear-end collision, the link members are operated against urging forces of the urging element(s) in a manner to move the connecting member to thereby move the pressure receiving member toward a rearward side, thereby allowing an occupant to sink into the seat-back side.

More specifically, the link members are configured to comprise: shaft parts; and locking portions provided for the associated urging element(s) and formed in positions at predetermined distances from the shaft parts, respectively; such that the link members are operatively supported by the shaft parts, respectively; and the urging element(s) are mounted between the locking portions and locking portions formed at the side frames, respectively. Further, the pressure receiving member is urged toward a forward side of the seat-back frame. Furthermore, the link members can be configured to be formed with holed portions, respectively, to which the connecting member is attached.

Moreover, the seat-back frame further comprises stoppers for defining allowed operation ranges of the link members, respectively, and the stoppers comprise first stoppers for defining initial positions before operation and second stoppers for defining stop positions after operation, respectively, thereby allowing an occupant to sink into a seat-back side within allowed operation ranges of the link members, to enable to adjust a sinking range.

Also, it is preferable that a threshold of a tension for causing the link members of the urging element(s) to start operations has a value which is larger than a tension to be applied in an ordinary driving environment and which is smaller than a tension to be applied upon rear-end collision. By such a configuration, the link members are not rotated within a range of load to be applied in an ordinary driving environment, in a manner not to affect seating feeling, thereby retaining a comfortable seating.

Further, a wire is used as the connecting member and the urging element(s) comprise tension springs, respectively, to simply construct them with a smaller number of parts, thereby reducing their costs in a light-weighted and space-saving manner.

The above problems are also solved by a vehicle seat, having a seat-back frame comprising: side frames separated from each other at least in a right-and-left direction and extending in an up-and-down direction; a pressure receiving member disposed between the side frames; and a connecting member for connecting the pressure receiving member to the side frames, the connecting member being connected to the side frames through link members which are operable relative to the side frames, respectively, and the link members being urged by urging element(s) for urging the connecting member toward a forward side of the seat-back frame.

Such a configuration results in a vehicle seat possessing the above-mentioned functions and effects.

The seat-back frame and vehicle seat of various embodiments of the present invention are configured to utilize the link members to allow for a rearward movement of the pressure receiving member (posture holding member), so that an occupant is allowed to efficiently sink into the seat upon rear-end collision. Further, since the urging element(s) have been already subjected to load adjustment at this time, the sinking capability does not depend on the structure of the posture holding member.

Furthermore, this seat-back frame and vehicle seat can be constructed with a smaller number of parts, thereby reducing their costs in a light-weighted and space-saving manner.

Moreover, this seat-back frame and vehicle seat are so configured that the link members are not rotated within a range of load to be applied in an ordinary driving environment, in a manner not to affect seating feeling, thereby retaining a comfortable seating.

In turn, this seat-back frame and vehicle seat do not involve any plastic deformations of the constituent members, and thus replacement of the members is unnecessary even after actuation thereof, thereby allowing for repetitive usage thereof.

BRIEF DESCRIPTION OF DRAWINGS

Various embodiments of the invention are illustrated in the following drawings and discussed below.

FIG. 5A, B are illustrative side views of states of the seat according to an embodiment of the present invention before and after rear-end collision.

DETAILED DESCRIPTION OF THE EMBODIMENTS

Embodiments of the present invention will be described hereinafter with reference to the drawings. The members, arrangements, and the like to be described hereinafter are not intended to restrict the present invention, and can be of course variously modified without departing from the spirit or scope of the present invention.

Figure 1:
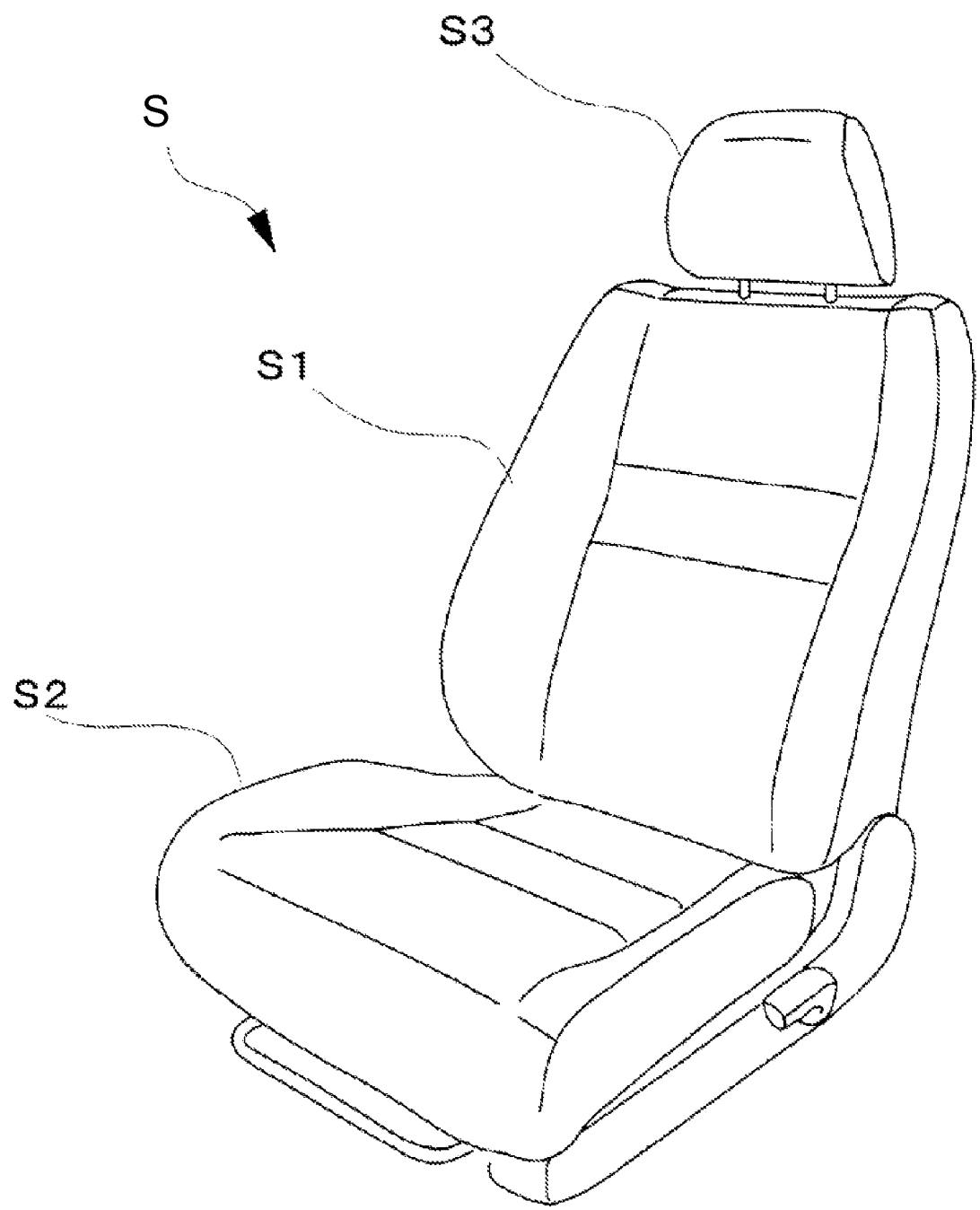
FIG. 1 is a pictorial schematic perspective view of a seat according to an embodiment of the present invention.

As shown in FIG. 1, the vehicle seat S according to this embodiment comprises a seat-back S1 (back portion), a seating portion S2, and a headrest S3.

Figure 2:
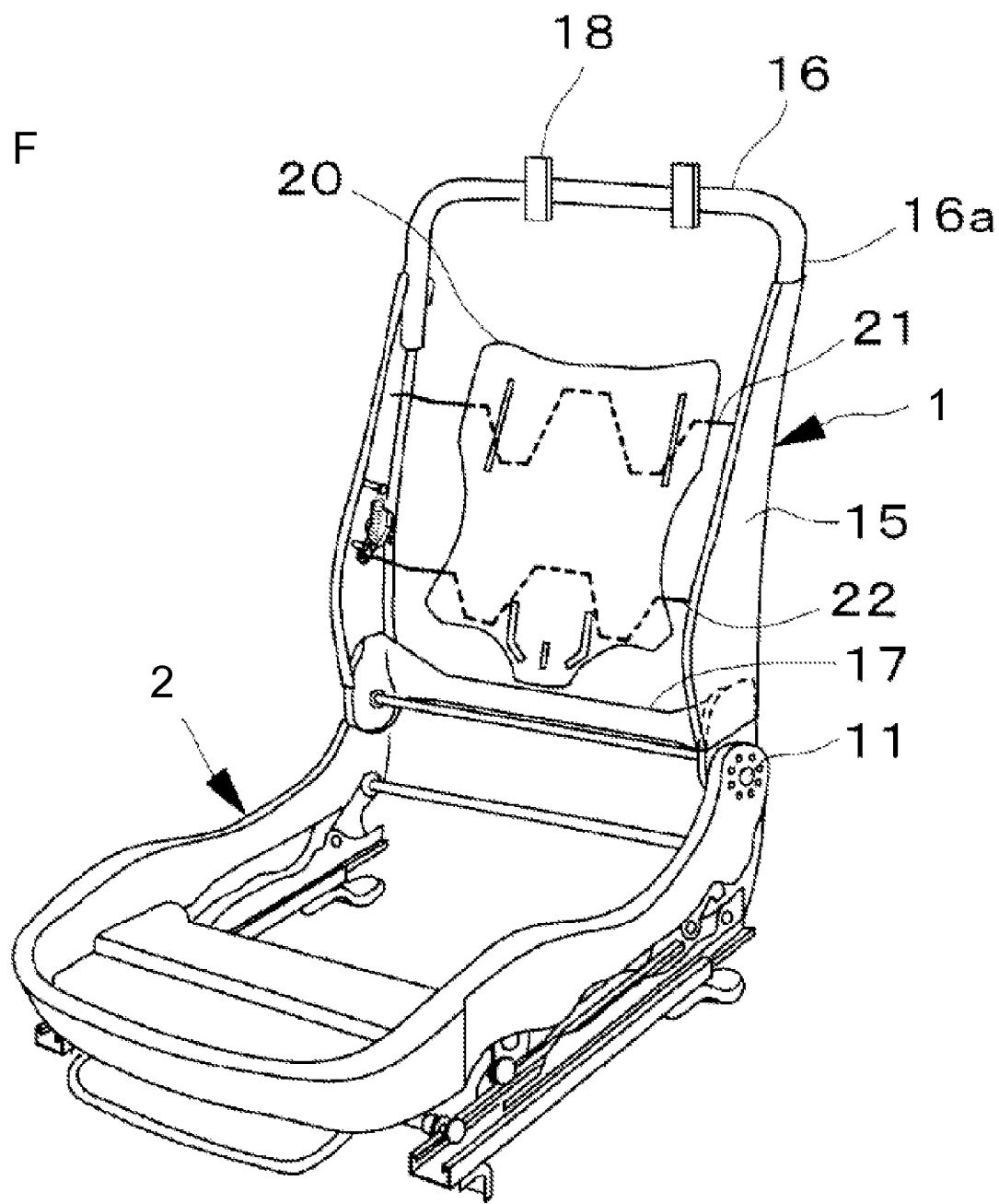
FIG. 2 is a pictorial schematic perspective view of a seat frame of the seat according to an embodiment of the present invention.

As shown in FIG. 2, the vehicle seat S includes a seat frame F comprising a seat-back frame 1 for constructing the seat-back S1, and a seating frame 2 for constructing the seating portion S2.

The seating frame 2 is covered thereon with a cushion pad, outer cover, and the like (not shown), and is configured to support an occupant from the below. The seating frame 2 is supported by leg portions thereof, and these leg portions have inner rails (not shown) attached thereto, respectively, such that the inner rails are combined with outer rails mounted on a vehicular body floor and are assembled in a sliding manner, which allow for positional adjustment in a fore-and-aft direction.

The seat-back frame 1 is connected to a rear end portion of the seating frame 2, through a reclining mechanism 11.

The seat-back frame 1 is covered with a cushion pad and the like (not shown) in a manner to support a back side of the occupant from the rearward, and is configured into a substantially rectangular frame body in this embodiment. More specifically, the seat-back frame 1 comprises: two side frames 15 arranged to be separated from each other in a right-and-left direction and extending in an up-and-down direction; an upper frame 16 for connecting upper end sides of the side frames 15 to each other; and a lower frame 17 for connecting lower end sides of the side frames 15 to each other.

The side frames 15 are extension members constituting lateral sides of the seat-back frame 1, respectively, and each include (see FIGS. 3 and 4) a side plate 15a in a planar shape, a front edge 15b inwardly folded back into a U-shape from a front end of the side plate 15a, and a rear edge 15c inwardly bent into an L-shape from a rear end of the side plate 15a.

The upper frame 16 is a member in a substantially rectangular channel shape, and includes lateral side portions 16a disposed to be partially overlapped with side plates 15a of the side frames 15, respectively, such that the upper frame 16 is affixedly joined to the side frames 15 at these overlapping portions.

Disposed above the seat-back frame 1 is a headrest frame (not shown). The headrest S3 is constructed by providing a cushion member at an outer periphery of the headrest frame, and by covering an outer periphery of the cushion member with a surface member. The headrest S3 is disposed by supporting the pillars of the headrest frame by pillar supporting parts 18 provided at the front portion of the upper frame 16.

Disposed between the pair of side frames 15 arranged to be separated from each other in a right-and-left direction and having predetermined lengths, respectively, are the cushion pad (not shown) and a pressure receiving member 20 as a posture holding member configured to support the cushion pad from the rearward. Further, stretched between the right and left side frames 15 are two wires 21, 22 as connecting members for supporting the pressure receiving member 20 and connecting it to the side frames 15.

The pressure receiving member 20 is a member formed of a plate-like resin in a substantially rectangular shape, and is formed with smooth bumps on its surface contacted with the cushion pad. The pressure receiving member 20 has a reverse side formed with, at its upper side and lower side, pawl portions for locking the wires 21, 22 thereto, respectively.

The wires 21, 22 of this embodiment are locked to the reverse side of the pressure receiving member 20 at the upper side and lower side thereof, respectively, and are extended in a right-and-left direction, to thereby support the pressure receiving member 20 parallelly to a backside of the cushion pad. The wires 21, 22 are each formed of a steel wire material having a spring characteristic, and each has a bent shape.

One 21 of the two wires 21, 22 locked to the pressure receiving member 20 of this embodiment which is locked to the upper side thereof, has opposite ends engagedly attached to attachment hole portions provided at the right and left side frames 15, respectively. In turn, the wire 22 locked to the lower side has opposite ends engagedly attached to holed portions 31 of link members 30 mounted on the right and left side frames 15, respectively.

Figure 3:
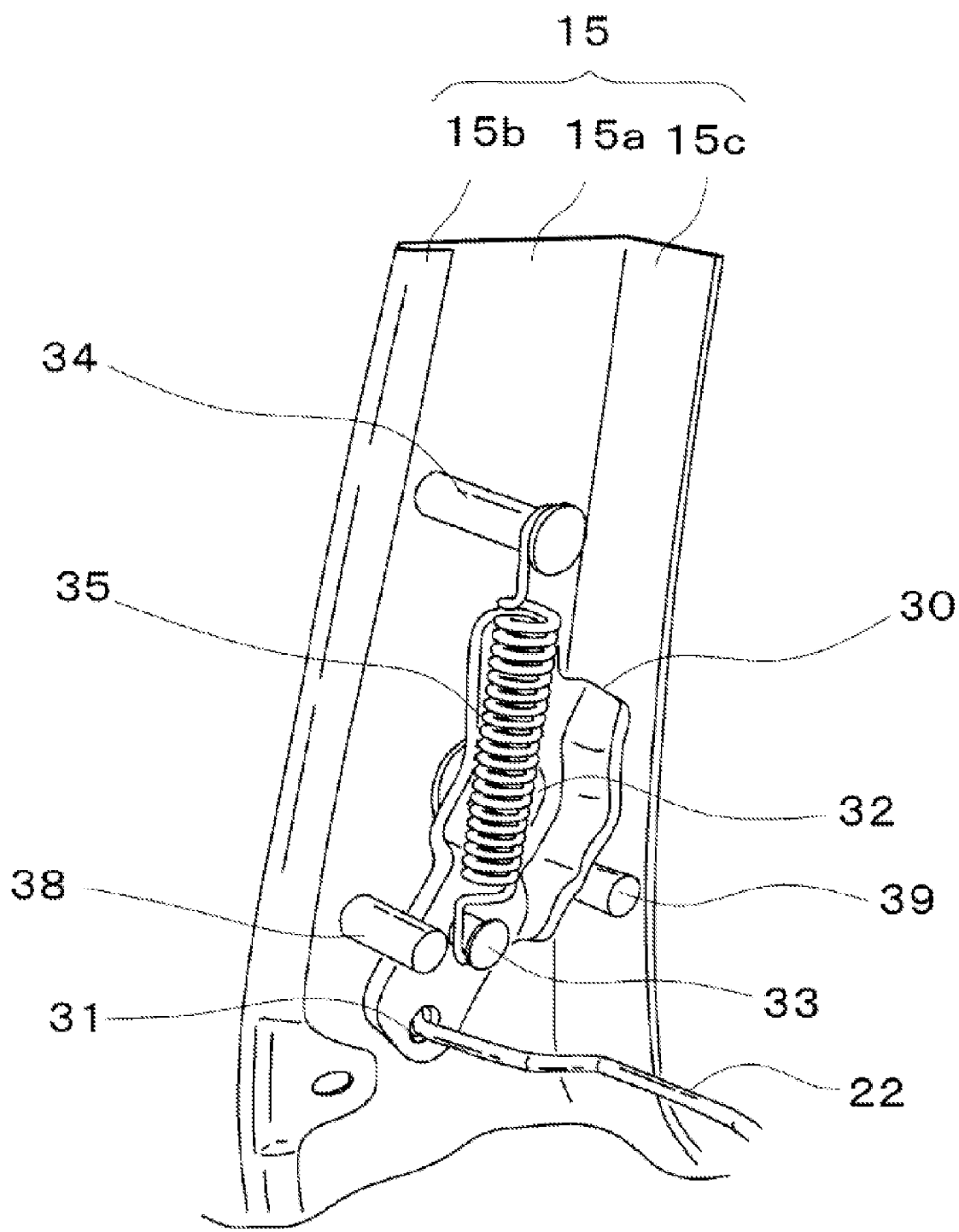
FIG. 3 is an enlarged perspective view of a link mechanism according to an embodiment of the present invention.
Figure 4:
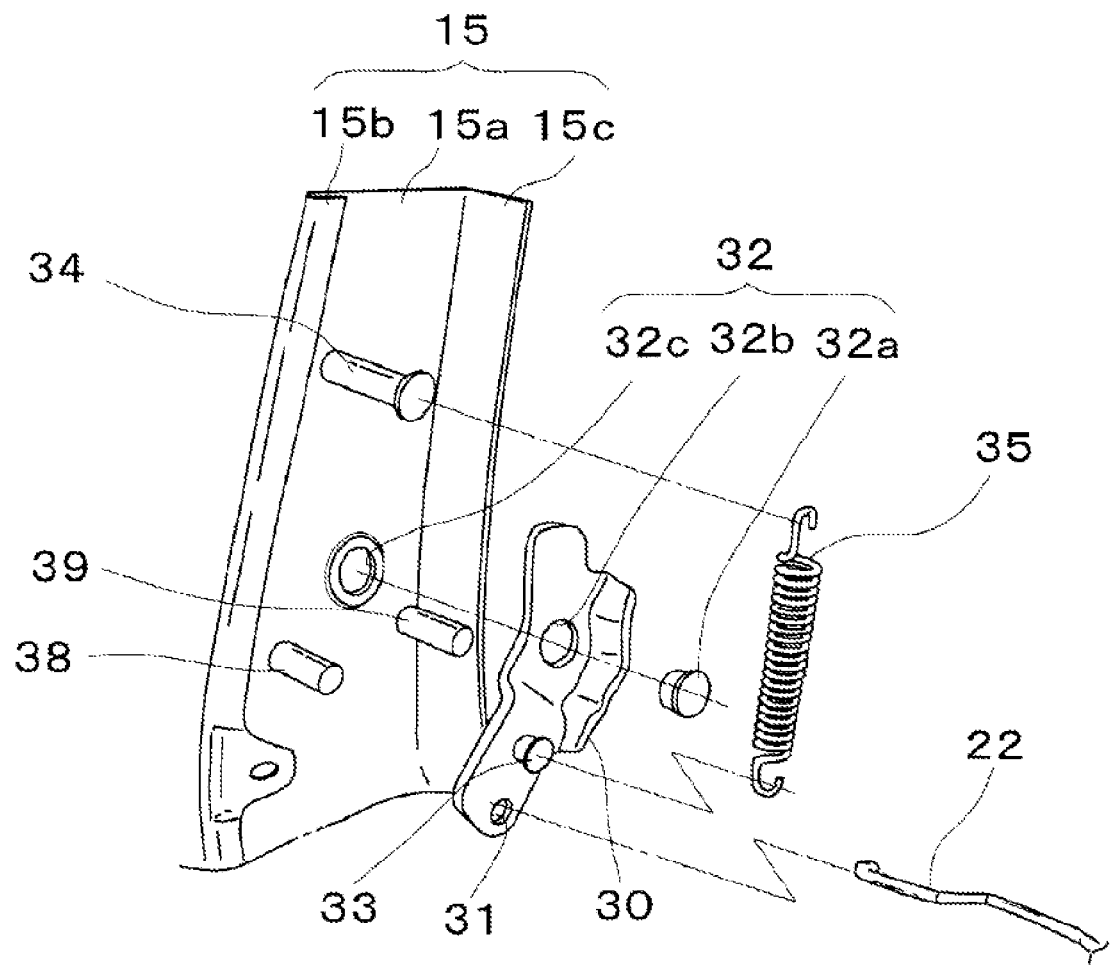
FIG. 4 is an exploded perspective view of the link mechanism according to an embodiment of the present invention.

As shown in FIG. 3 and FIG. 4, each link member 30 is a damping and connecting member in a curved, substantially rectangular shape rotatably supported by an associated shaft part 32 to an inside of the associated side plate 15*a* portion of the applicable one of the side frames 15 at opposite sides, and the link member 30 is formed with an extendedly bent portion in a perpendicular direction, at that side edge of the link member which does not interfere with an associated tension spring 35 to be described below and with the wire 22. Further, the link member 30 is formed with, at its lower side, the holed portion 31 for engagingly attaching an end of the wire 22 thereto, and is formed with, between the holed portion 31 and the shaft part 32, a first spring locking portion 33 in a cylindrical shape for locking the tension spring 35 thereto.

The shaft part 32 comprises a shaft member 32*a*, a holed portion 32*c* provided at the side plate 15*a* of the associated side frame 15, and a shaft hole 32*b* provided at the link member 30, and rotatably supports the link member 30 by penetrating the shaft member 32*a* through the shaft hole 32*b* and by fitting the former into the holed portion 32*c*.

The tension spring 35 as an urging element is locked to the link member 30 to thereby urge it toward the forward side of the seat-back frame 1, and is constituted of a tension coil obtained by coil formation of a spring wire material. Further, the tension spring 35 has opposite ends formed into semicircular hooks to be locked to spring locking portions, respectively.

The link mechanism based on the link member 30 according to this embodiment will be explained below for its operation.

Engagedly attached to the link member 30 is an end of the wire 22 at the holed portion 31 provided at the lower side of the link member 30. Further, the hook, at one end side of the tension spring 35, is locked to the first spring locking portion 33 positioned between the shaft part 32 and holed portion 31 of the link member 30, and the hook at the other end side is locked to a second spring locking portion 34 disposed above the link member 30 on the side frame 15, thereby constantly urging the link member 30 in a manner to rotate it forwardly.

Provided at the side frame 15 side is a stopper assembly for defining an allowed operation range of the associated link member 30. This stopper assembly comprises two columnar steel material elements (stoppers) 38, 39 provided at the side frame 15 side to protrude therefrom, and includes a first stopper 38 for setting an initial position before operation and a second stopper 39 for setting a stop position after operation, which stoppers are strongly affixed to a side plate portion of the side frame 15 in a manner to confine the link member 30 in a narrow space to thereby restrict its operation (rotation) thereof at upper and lower limit positions of the defined operation range of the link member 30.

Namely, the first stopper 38 and second stopper 39 are arranged at such positions that the link member 30 is restrained from further rotating when the link member 30 is rotated up to the initial position or the position after rotation to contact with either stopper (first stopper 38 or second stopper 39).

The above described link mechanisms are mounted on the right and left side frames 15, respectively, and opposite ends of the wire 22 are engagedly attached to the holed portions 31 of the link members 30, respectively, such that the right and left link mechanisms function in a paired manner.

In an ordinary driving environment where an occupant is seated, a tension tending to rearwardly operate or rearwardly rotate the link members 30 is applied thereto through a cushion seat, the pressure receiving member 20, and the wire 22 within the seat-back S1, while the tension springs 35 urge the link members 30 so as to operate them toward the forward side of the seat-back frame 1. Here, each tension spring 35 connected to the associated link member 30 has a load characteristic which is not yielded insofar as within a range of load to be applied in the ordinary driving environment, so that the link member 30 normally abuts on the first stopper 38 at the initial position side and is kept at the initial position.

Upon rear-end collision as shown in FIGS. 5A and 5B (FIG. 5A shows a state before collision, and FIG. 5B shows a state during collision), when an occupant is subjected to an impact from the rearward and tends to move rearwardly due to inertia, this load applies a tension to the link members 30 in directions to rearwardly operate or rotate them, through the pressure receiving member 20, and the wire 22 locked to the pressure receiving member 20. The tension applied at this time provides a load sufficient for yielding the tension springs 35 keeping the link members 30 at initial positions, respectively, to thereby rearwardly operate or rotate the link members 30.

By rearwardly operating or rotating the link members 30 in the above manner, the wire 22 engagedly attached to the holed portions 31 is rearwardly moved, resulting in that the pressure receiving member 20 locked to the wire 22 and the cushion pad supported by the pressure receiving member 20 are allowed to sink into the seat-back S1 together with a chest portion of an occupant.

The link members 30 will be explained in more detail for operating characteristics thereof upon rear-end collision.

As described above, each link member 30 has the substantially rectangular shape forwardly curved relative to the seat, is formed with the holed portion 31 at the lower side of the link member 30 itself for engagingly attaching the wire 22 thereto, and is provided with the first spring locking portion 33 for the tension spring 35, between the shaft part 32 and holed portion 31.

The holed portion 31 and the first spring locking portion 33 are arranged to be positioned forward of the associated shaft part 32 at the initial position of the link member 30 before operation, and then the other end of the tension spring 35 is locked to the second spring locking portion 34 affixed to the side frame 15, above the link member 30.

When the wire 22 is subjected to the tension and the link members 30 are caused to start to operate or rotate, the first spring locking portions 33 provided on the link members 30 are caused to rearwardly move while operating or rotating around the shaft parts 32, respectively. In turn, the other ends of the tension springs 35 are fixed at positions above the link members 30, respectively, resulting in such a configuration that moving directions of the first spring locking portions 33 do not coincide with directions in which the springs are yielded.

Namely, operating or rotating amounts of the link members 30 are configured to be out of proportion to tension loads (yielded amounts) of the tension springs 35, and in other words, operated positions or rotate angles of the link members 30 have relationships, which are not simply proportional, with torques (rotating forces) to be given by the tension springs 35 in directions of forward operation or forward rotating of the link members 30, respectively.

Here, the relationship between the first spring locking portion 33 and the second spring locking portion 34, to which opposite ends of the associated tension spring 35 are locked, respectively, will be further explained.

While the first spring locking portion 33 for locking the lower end of the tension spring 35 thereto draws an arcuate locus around the associated shaft part 32 as a rotate center, the second spring locking portion 34 for locking the upper end of the tension spring 35 thereto is formed as a fixed end affixedly joined to a position above the link member 30.

As such, the tension load (yielded amount) of the tension spring 35 becomes maximum, when the shaft part 32, and the first spring locking portion 33 and second spring locking portion 34, to which the opposite ends of the tension spring 35 are locked, are aligned on a straight line. However, in a range just before this maximum load point, i.e., near the rotating amount where the locus drawn by the first spring locking portion 33 mounted to the link member 30 side comes to a position farthest from the second spring locking portion 34 as the other end of the tension spring 35, the change amount of the distance between the first spring locking portion 33 and second spring locking portion 34 for locking the tension spring 35 thereto becomes small, thereby bringing about a range where the change amount of the tension load of the tension spring 35 becomes very small relative to the operated position, rotated angle, and the like.

In case of the configuration according to various embodiments of the present invention, the rearward operating or rotating amounts of the link members 30 where the link members are stopped by the second stoppers 39, are set to be located at positions just before the maximum load points of the tension springs 35, respectively. Thus, the tension to be applied to the link members 30 through the wire 22 when the link members 30 start to operate or rotate, is made to have a value substantially close to that of a tension which is kept applied to the link members 30 until the link members 30 abut to the second stoppers 39 and thus the operations or rotation of the link members are restricted (i.e., until the operations or rotation are terminated), respectively.

The threshold of the tension for starting the operations or rotation is set at a large value, such that the operations or rotation are not caused insofar as in an ordinary driving environment. Contrary, the tension to be applied to the link members 30 through the wire 22 upon rear-end collision is an impact energy, so that this tension has a value larger than the threshold.

As such, once the link members 30 start operations or rotation due to rear-end collision, the link members 30 are caused to rotate without stopping along the ways until they are stopped by the second stoppers 39, respectively, thereby allowing an occupant to assuredly sink into the cushion pad of the seat-back S1.

The link members 30 have the above described operating or rotating characteristics relative to the tension to be applied through the wire 22, thereby allowing the occupant to sink into the cushion pad of the seat-back S1 assuredly and efficiently.

At this time, although the back portion of the occupant has been moved rearwardly by sinking into the seat-back S1, the position of the headrest S3 is relatively unchanged, so that the gap between the headrest S3 and the head portion of the occupant is reduced to exhibit an effect to efficiently mitigate an impactive shock to be otherwise applied to the neck portion of the occupant.

Further, according to the present invention, the occupant is not interlocked with the forward movement of the headrest while the occupant sinks into the seat-back S1, resulting in a reduced loss of rearward movement energy of the occupant upon rear-end collision, thereby allowing the occupant to sink more deeply into the seat cushion.

Note that this embodiment has been explained for the seat-back S1 of a front seat of a vehicle as a specific example, the present invention is not limited thereto, and it is of course possible to also apply the same configuration to a seat-back of a back seat.

| TABLE OF REFERENCE CHARACTERS | |
|---|---|
| S | vehicle seat |
| S1 | seat-back |
| S2 | seating portion |
| S3 | headrest |
| F | seat frame |
| 1 | seat-back frame |
| 2 | seating frame |
| 11 | reclining mechanism |
| 15 | side frame |
| 15a | side plate |
| 15b | front edge |
| 15c | rear edge |
| 16 | upper frame |
| 16a | lateral side portion |
| 17 | lower frame |
| 18 | pillar supporting part |
| 20 | pressure receiving member |
| 21, 22 | wire |
| 30 | link member |
| 31 | holed portion |
| 32 | shaft part |
| 32a | shaft member |
| 32b | shaft hole |
| 32c | holed portion |
| 33 | first spring locking portion |
| 34 | second spring locking portion |
| 35 | tension spring |
| 38 | first stopper |
| 39 | second stopper |

The invention claimed is:
1. A vehicle seat, comprising:
a seat-back frame comprising:
    side frames separated from each other in a right-and-left direction and extending in an up-and-down direction; and an upper frame that connects between upper end portions of the side frames,
a headrest disposed to the seat-back frame;
a pressure receiving member disposed between the side frames;
link members that are operable relative to the side frames, respectively, and independently of the headrest; and
a connecting member for connecting the pressure receiving member to the side frames through the link members, wherein the link members are configured so that the connecting member is urged toward a forward side of the seat-back frame by urging elements;
wherein:
a projecting portion is provided on an inner side of each side frame and above each link member; and
an end of each urging element is locked to the respective projecting portion.

2. A vehicle seat according to claim 1, wherein:
each link member is formed with an extendedly bent portion at a side edge of the link member;
the extendedly bent portion is disposed at a different position from an attachment portion at which the connecting member is attached to the link member; and
the extendedly bend portion comprises a stopper portion for restricting rearward movement of the link member.

3. A vehicle seat according to claim 1, wherein:
each link member is formed with an extendedly bent portion at a side edge of the link member which does not interfere with the urging elements and the connecting member;
the extendedly bent portion is disposed at a different position from an attachment portion at which the connecting member is attached to the link member; and
the extendedly bend portion comprises a stopper portion for restricting rearward movement of the link member.

4. A vehicle seat according to claim 1, wherein:
each link member is formed with an extendedly bent portion at a side edge of the link member which does not interfere with the urging elements and the connecting member; and
the extendedly bent portion comprises a stopper portion for restricting rearward movement of the link member.

5. A vehicle seat according to claim 1, wherein:
each link member is provided with a shaft part and a first locking portion for locking an end portion of the respective urging element;
each side frame is provided with a second locking portion for locking an other end portion of the respective urging element; and
the shaft part, the first locking portion and the second locking portion are aligned on a straight line as the respective link member moves.

6. A vehicle seat according to claim 1, wherein:
each link member is provided with a shaft part and a first locking portion for locking an end portion of the urging element;
each side frame is provided with a second locking portion for locking an other end portion of the urging element; and
a tension load of the respective urging element becomes maximum when the shaft part, the first locking portion and the second locking portion are aligned on a straight line.

7. A vehicle seat according to claim 1, wherein:
each side frame is provided with a stopper assembly for defining an allowed operation range of the respective link member;
each link member is arranged between respective elements of the stopper assembly; and
the stopper assembly comprises a rearward movement restriction stopper; and
a center of an axis of the link member is disposed at a higher position than the rearward movement restriction stopper.

8. A vehicle seat according to claim 7, wherein each stopper assembly comprises a columnar element fixed to the respective side frame.

9. A vehicle seat according to claim 1, wherein the pressure receiving member has a plate shape and moves rearward to a position posterior to the side frame upon rear-end collision.

10. A vehicle seat according to claim 1, wherein:
the pressure receiving member has a plate shape; and
a whole of the pressure receiving member moves rearward to a position posterior to the side frames and independently of the headrest upon rear-end collision.

11. A vehicle seat according to claim 1, wherein each side frame is provided with a respective stopper assembly protruding inward at a rear portion thereof for restricting rearward movement of the respective link member.

12. A vehicle seat according to claim 1, wherein a concave portion is formed at a side portion of the pressure receiving member at a same height as each link member.

13. A vehicle seat, comprising:
a seat-back frame comprising:
side frames separated from each other in a right-and-left direction and extending in an up-and-down direction; and
an upper frame that connects between upper end portions of the side frames,
a headrest disposed to the seat-back frame;
a pressure receiving member disposed between the side frames;
link members that are operable relative to the side frames, respectively, and independently of the headrest; and
a connecting member for connecting the pressure receiving member to the side frames through the link members,
wherein:
the link members are configured so that the connecting member is urged toward a forward side of the seat-back frame by urging elements;
each link member has an inward bent portion that is bent inward in a right-and-left direction, and is formed with a holed portion for engaging the connecting member at a lower portion of the link member and at the inwardly bent portion;
each holed portion has a clearance between the respective connecting member and an inner surface thereof; and
an end portion of each urging element is locked to the respective side frame above the link member.

14. A vehicle seat according to claim 13, wherein:
each link member is provided with a shaft part and an urging element locking portion for locking an other end portion of the urging element; and
each holed portion and the urging element locking portion are arranged to be positioned forward of the shaft part at an initial position of the respective link member.

15. A vehicle seat according to claim 14, wherein each urging element locking portion draws arcuate locus around the respective shaft part as a rotate center.

16. A vehicle seat, comprising:
a seat-back frame comprising:
side frames separated from each other in a right-and-left direction and extending in an up-and-down direction; and an upper frame that connects between upper end portions of the side frames,
a headrest disposed to the seat-back frame;
a pressure receiving member disposed between the side frames;
link members that are operable relative to the side frames, respectively, and independently of the headrest;
a connecting member for connecting the pressure receiving member to the side frames through the link members; and
an elastic member that connects between the side frames and supports the pressure receiving member;
wherein:
the link members are configured so that the connecting member is urged toward a forward side of the seat-back frame by urging elements;
each side frame is provided with an attachment portion for attaching a respective end of the elastic member to the side frame; and
an upper end of the respective link member is disposed below the attachment portion.

17. A vehicle seat, comprising:
a seat-back frame comprising:
side frames separated from each other in a right-and-left direction and extending in an up-and-down direction; and
an upper frame that connects between upper end portions of the side frames,
a headrest disposed to the seat-back frame;
a pressure receiving member disposed between the side frames;
link members that are operable relative to the side frames, respectively, and independently of the headrest;
a connecting member for connecting the pressure receiving member to the side frames through the link members; and
an elastic member that connects between the side frames and supports the pressure receiving member;
wherein:
the link members are configured so that the connecting member is urged toward a forward side of the seat-back frame by urging elements;
each side frame is provided with an urging element locking portion for locking an end of the urging element; and
each urging element locking portion is disposed above an upper end of the respective link member and below the respective elastic member.

18. A vehicle seat, comprising:
a seat-back frame comprising:
side frames separated from each other in a right-and-left direction and extending in an up-and-down direction; and
an upper frame that connects between upper end portions of the side frames,
a headrest disposed to the seat-back frame;
a pressure receiving member disposed between the side frames;
link members that are operable relative to the side frames, respectively, and independently of the headrest; and
a connecting member for connecting the pressure receiving member to the side frames through the link members,
wherein:
the link members are configured so that the connecting member is urged toward a forward side of the seat-back frame by urging elements;
each side frame is provided with a stopper assembly at a rear portion thereof for restricting rearward movement of the respective link member; and
a respective biasing member overlaps with a shaft part of the link member in a right-to-left direction when the link member comes into contact with the stopper assembly.

19. A vehicle seat according to claim 18, wherein:
a respective line that connects between both ends of each urging element in a longitudinal direction is positioned in front of an axis of the respective shaft part of the link member.

20. A vehicle seat, comprising:
a seat-back frame comprising:
side frames separated from each other in a right-and-left direction and extending in an up-and-down direction; and
an upper frame that connects between upper end portions of the side frames,
a headrest disposed to the seat-back frame;
a pressure receiving member disposed between the side frames;
link members that are operable relative to the side frames, respectively, and independently of the headrest; and
a connecting member for connecting the pressure receiving member to the side frames through the link members,
wherein:
the link members are configured so that the connecting member is urged toward a forward side of the seat-back frame by urging elements;
each link member is formed with a shaft part and a holed portion for engaging the connecting member;
each side frame is provided with a stopper assembly for restricting rearward movement of the link member; and
each stopper assembly is disposed between the respective shaft part and the holed portion.

21. A vehicle seat, comprising:
a seat-back frame comprising:
side frames separated from each other in a right-and-left direction and extending in an up-and-down direction; and
an upper frame that connects between upper end portions of the side frames,
a headrest disposed to the seat-back frame;
a pressure receiving member disposed between the side frames;
link members that are operable relative to the side frames, respectively, and independently of the headrest; and
a connecting member for connecting the pressure receiving member to the side frames through the link members,
wherein:
the link members are configured so that the connecting member is urged toward a forward side of the seat-back frame by urging elements;
each link member is provided with a shaft part and an urging element locking portion for locking an end portion of the urging element;
each side frame is provided with a stopper assembly for restricting rearward movement of the respective link member; and
each stopper assembly is disposed between the respective shaft part and the urging element locking portion.

22. A vehicle seat, comprising:
a seat-back frame comprising:
side frames separated from each other in a right-and-left direction and extending in an up-and-down direction; and an upper frame that connects between upper end portions of the side frames,
a headrest disposed to the seat-back frame;
a pressure receiving member disposed between the side frames;
link members that are operable relative to the side frames, respectively, and independently of the headrest; and
a connecting member for connecting the pressure receiving member to the side frames through the link members, wherein:
the link members are configured so that the connecting member is urged toward a forward side of the seat-back frame by urging elements;
each side frame is provided with a first stopper for restricting forward movement of the respective link member and a second stopper for restricting rearward movement of the respective link member; and
a contact area of each link member with its second stopper is larger than that of each link member with the its stopper.

23. A vehicle seat, comprising:
a seat-back frame comprising:
side frames separated from each other in a right-and-left direction and extending in an up-and-down direction; and
an upper frame that connects between upper end portions of the side frames,
a headrest disposed to the seat-back frame;
a pressure receiving member disposed between the side frames;
link members that are operable relative to the side frames, respectively, and independently of the headrest; and
a connecting member for connecting the pressure receiving member to the side frames through the link members, wherein:
the link members are configured so that the connecting member is urged toward a forward side of the seat-back frame by urging elements;
each link member is provided with a shaft part and an urging element locking portion for locking an end portion of the urging element;
each urging element locking portion draws an arcuate locus around the respective shaft part as a rotate center;
the pressure receiving member has a plate shape and moves rearward to a position posterior to the side frames upon rear-end collision;
each side frame is provided with a stopper assembly protruding inward at a rear portion thereof for restricting rearward movement of the respective link member; and
a respective biasing member overlaps with a shaft part of the link member in a right-to-left direction when the link member comes into contact with the stopper assembly.

24. A vehicle seat, comprising:
a seat-back frame comprising:
side frames separated from each other in a right-and-left direction and extending in an up-and-down direction; and
an upper frame that connects between upper end portions of the side frames,
a headrest disposed to the seat-back frame;
a pressure receiving member disposed between the side frames;
link members that are operable relative to the side frames, respectively, and independently of the headrest; and
a connecting member for connecting the pressure receiving member to the side frames through the link members, wherein:
the link members are configured so that the connecting member is urged toward a forward side of the seat-back frame by urging elements;
each link member is provided with a first locking portion for locking an end portion of the respective urging element;
each side frame is provided with a second locking portion for locking an other end portion of the respective urging element;
a shaft part of the respective link member is disposed between the first locking portion and the second locking portion;
a projecting portion is provided on an inner side of each side frame and above each link member; and
an end of each urging element is locked to the respective projecting portion.

* * * * *